Feb. 3, 1959            R. W. HART            2,872,577
HIGH FREQUENCY INTEGRATING SIGNAL DETECTOR
Filed Aug. 13, 1956            4 Sheets-Sheet 1
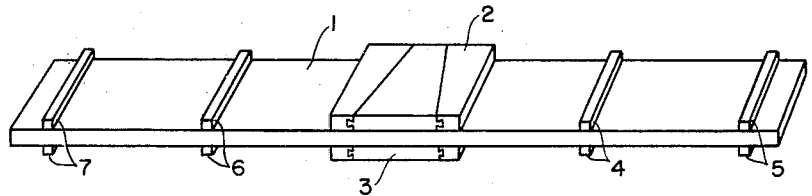
Fig. 1
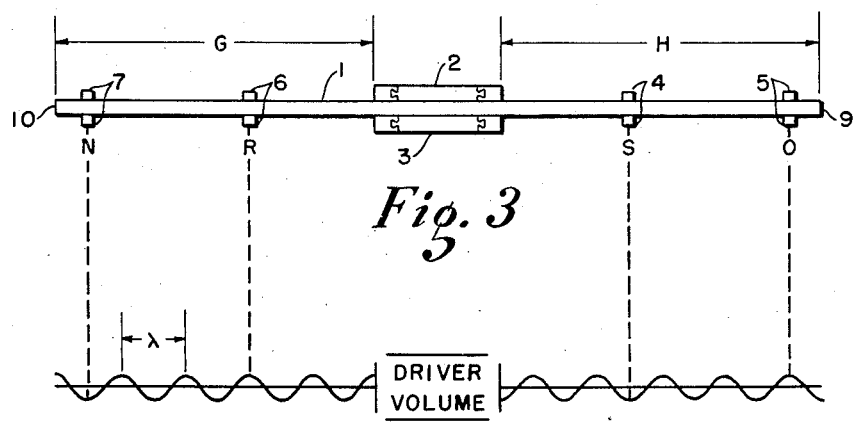
Fig. 3
Fig. 4
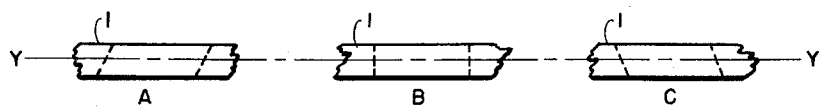
Fig. 2
INVENTOR.
Robert W. Hart INVENTOR.
Robert W. Hart Feb. 3, 1959 R. W. HART 2,872,577
HIGH FREQUENCY INTEGRATING SIGNAL DETECTOR
Filed Aug. 13, 1956 4 Sheets-Sheet 4

INVENTOR.
Robert W. Hart

United States Patent Office 2,872,577
Patented Feb. 3, 1959

2,872,577

HIGH FREQUENCY INTEGRATING SIGNAL DETECTOR

Robert W. Hart, Lynn, Mass.

Application August 13, 1956, Serial No. 603,850

7 Claims. (Cl. 250—31)

(Granted under Title 35, U. S. Code (1952), sec. 266)

The invention described herein may be manufactured and used by or for the Government of the United States of America for governmental purposes without the payment of any royalties thereon or therefor.

This invention relates to apparatus for detecting high frequency signals and, more particularly, to an integrator of high frequency signals employing a resonant electromechanical system as a means of accumulating and storing signal energy. The apparatus is inherently capable of detecting weak signals of high frequencies in the presence of heavy random noise as contrasted with presently known detecting systems which, under the same conditions, would completely fail to recognize weak signals.

This invention is an improvement upon the integrating signal detector described in copending application, Serial No. 578,551, filed April 16, 1956, by Robert W. Hart. The earlier invention described in the copending application utilizes a resonant mechanical system consisting of tuned reeds. That invention employs a pair of vibrating reed systems driven to oscillate in phase at a fixed frequency, one of the vibrating systems being used as a "standard" and signal energy being injected into the other vibrating system which stores and integrates the injected signal energy. A comparator circuit then compares the amplitude of the "standard" vibrating system with the amplitude of the signal integrating vibrating system. That invention incorporates many desirable features for detecting small, low frequency signals, but the purely mechanical vibrating reed system does not lend itself to high-speed communications.

The invention described herein extends the techniques of vibrating integrating signal detectors to higher frequencies than could hitherto be accommodated, i. e., above 100 kc./s. In accordance with the preferred embodiment of the invention, a bar of piezoelectric material, such as quartz, fashioned in a manner to vibrate in thickness sheer mode, is utilized as the resonant element. The piezoelectric bar is set into mechanical vibration by an alternating electric field applied to a central volume of the bar. The entire bar is caused to vibrate as the motion of the excited volume is progressively transmitted to the remainder of the bar as a wave motion moving with acoustical velocity in the bar. The portions of the piezoelectric bar external to the central volume can be considered as constituting a pair of vibratory systems. One of these vibrating systems is used as a "standard"; signal energy is discretely injected into the other vibrating system, which integrates the injected signal energy. A comparator circuit is provided which compares the amplitude of the "standard" vibrating system with the amplitude of the other vibrating system, and the output of the comparator is employed to actuate an indicator.

The piezoelectric vibrating device disclosed herein is normally driven to a constant amplitude at an unvarying frequency by a stable local oscillator. The losses in the piezoelectric vibrator while thus driven are supplied in the process of driving. The sensitivity of the driven vibrator to external signal energy is a function of the amount of energy required to cause a change in the vibrator oscillations, and in oscillating piezoelectric vibrators very little external energy is required to cause a change. Oscillating piezoelectric vibrators are therefore very sensitive. The effects of successive small signal energies discretely injected into a piezoelectric vibrator are integrated over time; consequently, the threshold of signal energy is determined by the energy loss per cycle in the piezoelectric vibrator due solely to an increase in amplitude. Where the discrete energy injected per cycle is larger than this energy loss per cycle, an increase in vibrational amplitude results.

This invention is based upon the mechanical storage of discrete signal energy in a vibrating piezoelectric bar. The novel device is an extremely sensitive signal integrator capable of operation at high frequencies and, at the same time, is highly selective to a wanted signal while inherently tending to reject random noise associated with the signal. By differential methods the effects of random noise, such as atmospherics, can be further greatly reduced in their final effect on the output of the integrator. The device is capable of adjustment to integrate a predetermined number of signal cycles before giving an output indication. It integrates rapidly enough to be useful at telegraphic speeds at least as high as sixty words per minute without sacrificing any of its desirable characteristics.

Because of the high selectivity of the integrating signal detector, extremely weak signals may be received through a background of heavy noise. High amplification may precede the device to build up the signal, because amplifier noise, which is of a random nature, has no discernible effect on the integrator. The integrator accepts bits of signal energy, stores these bits without much loss, and finally indicates presence of the signal in a positive sense. The piezoelectric integrator provides precise selectivity without any of the skirt selectivity problems normally encountered in purely electrical resonant devices.

It is an object of this invention to provide apparatus highly sensitive to small electrical signals of high frequency and highly selective as to frequency, while providing a maximum factor of noise rejection.

Another object of this invention is to provide a signal detector employing a vibrating system which combines a period of integration based on amplitude increase with a period of integration based on the velocity of wave motion along the vibrator.

It is a further object of this invention to provide a signal detector capable of detecting small signals in a backround of heavy random noise.

Still another object of this invention is to provide means for comparing the amplitude of a "standard" driven vibrator with the amplitude of a driven signal integrating vibrator, thus eliminating drive power as a factor.

It is an object of this invention to extend the techniques of an integrating signal detector to higher frequencies than could hitherto be accommodated.

Other objects and many of the attendant advantages of this invention will be readily appreciated as the same becomes better understood by reference to the following detailed description when considered in connection with the accompanying drawings wherein:

Fig. 1 is a perspective view of a piezoelectric bar showing the disposition of the electrodes;

Fig. 2 is included to show the manner in which the piezoelectric bar is set into oscillation;

Fig. 3 is an elevational view of the piezoelectric bar;

Figure 5:
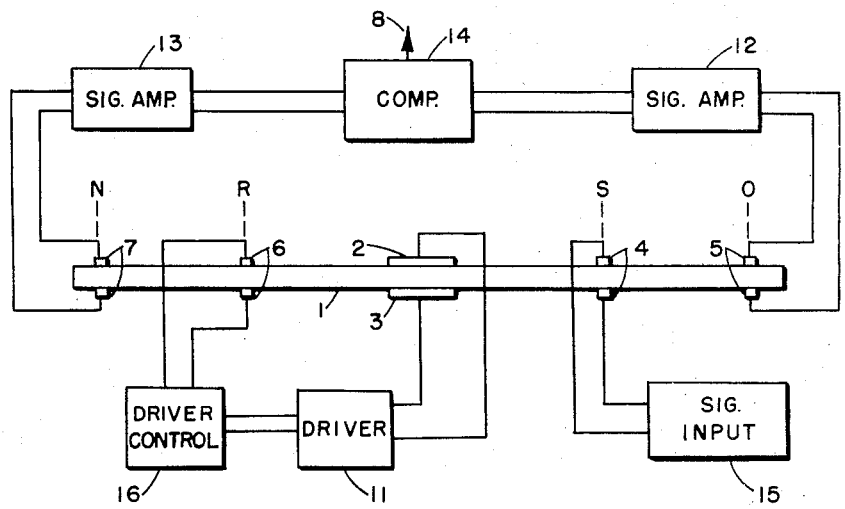
Figure 6:
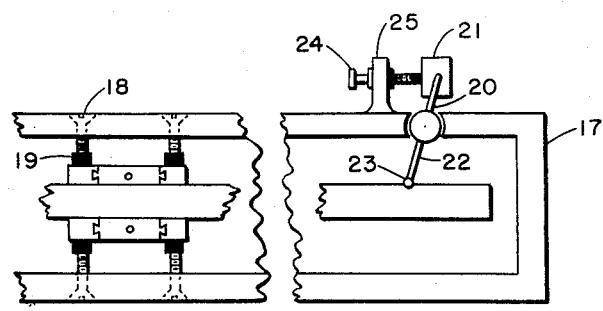
Figure 7:
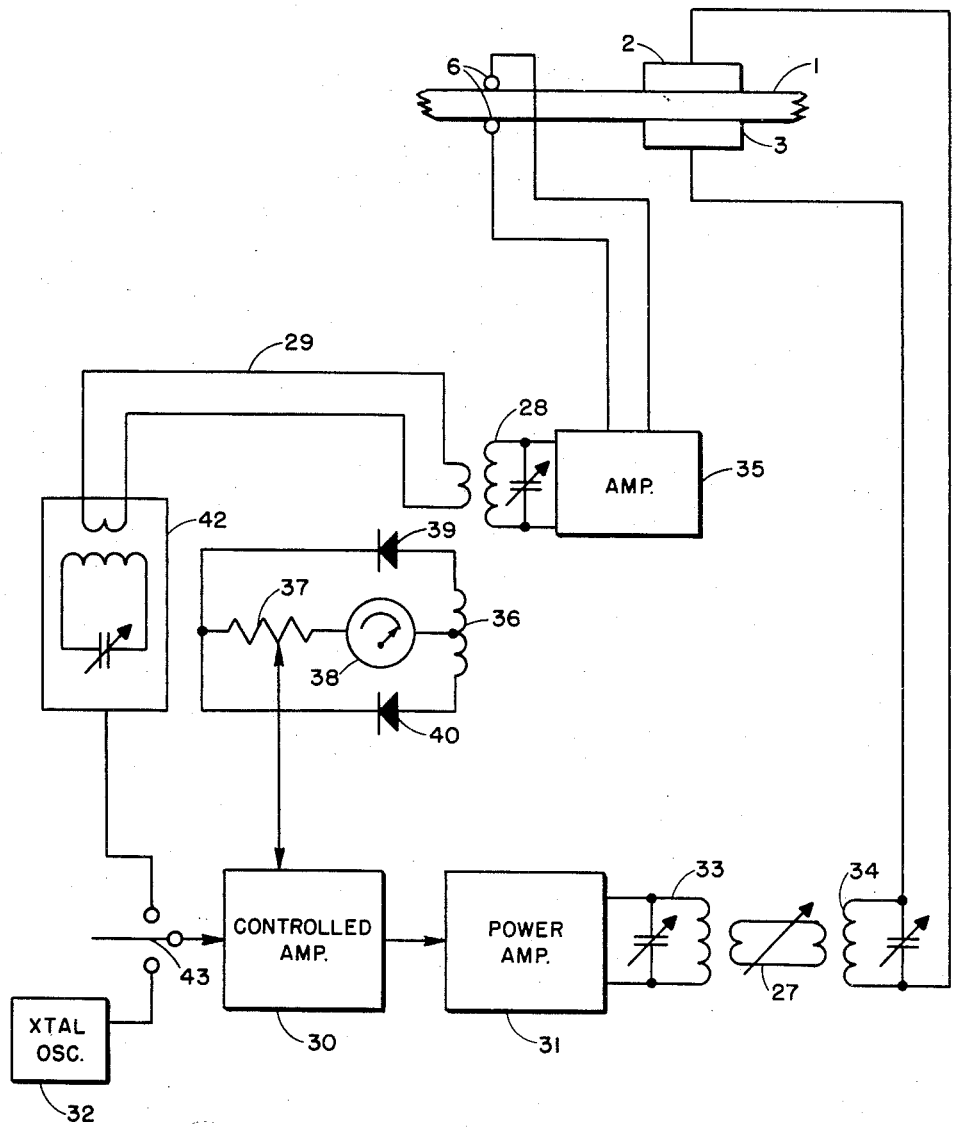
Figure 9:
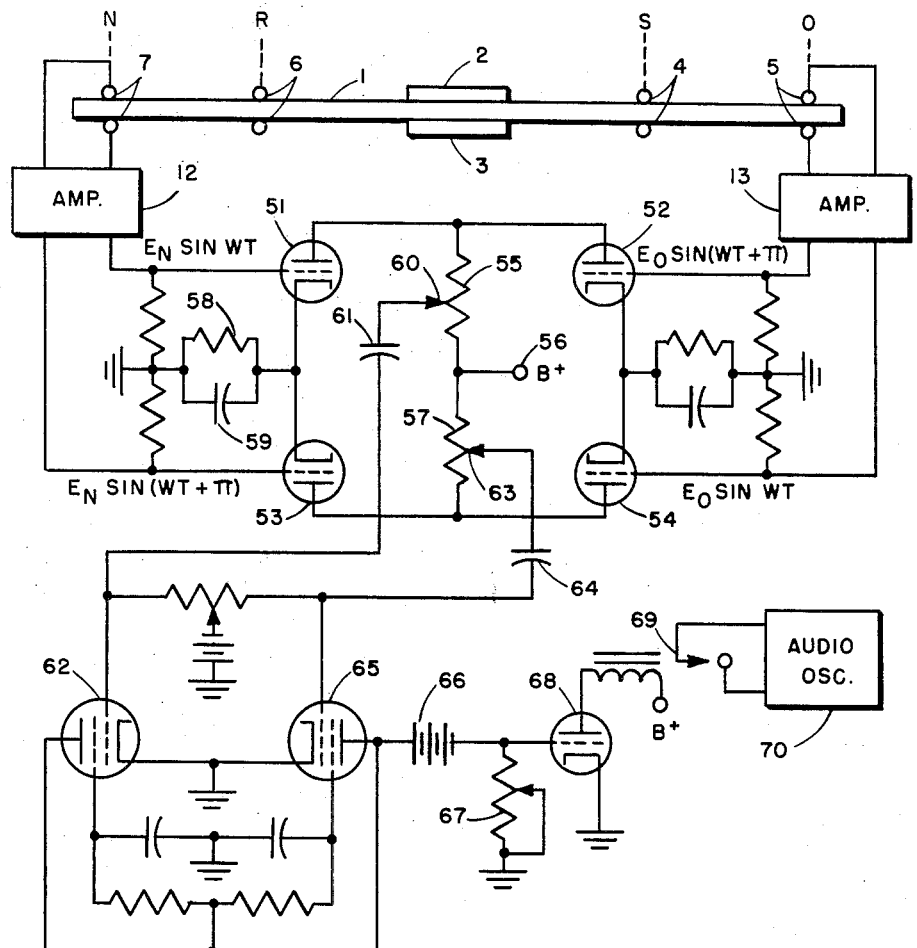
Figure 8:
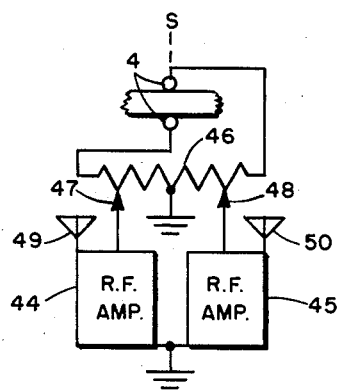

Fig. 4 indicates the wave motion obtaining in the piezoelectric bar of Fig. 3;

Fig. 5 is a schematic view of the invention;

Fig. 6 depicts mechanical details af electrode mountings;

Fig. 7 is a schematic diagram of the driver system;

Fig. 8 indicates a scheme for injecting a signal whereby the effect of noise is greatly reduced; and Fig. 9 is a schematic view of the preferred system for obtaining an output indication.

Referring now to Fig. 1, there is shown a long bar 1 of piezoelectric material cut in a manner to vibrate in the thickness shear mode. Normally, the material would be rectangular in shape. A pair of driver electrodes 2 and 3 are disposed on opposite surfaces of the central portion of bar 1. When excited by an alternating voltage of suitable frequency applied to the electrodes 2 and 3, the volume of the bar included between the electrodes will distort. The electric field established by the alternating voltage will, during the first half cycle of the alternating voltage, cause the driver volume to distort as shown in Fig. 2A, for example. The portion above the axis $y$—$y$ will distort to the right and the portion below the axis will distort to the left; as the alternating voltage passes through zero, the driver volume will assume its undistorted position as shown in Fig. 2B. During the second half of the alternating voltage cycle, the distortion will occur in an opposite sense, that is, the upper portion of the driver volume will move to the left and the lower portion will move to the right, as shown in Fig. 2C. The excitation voltage sets up in the distorted driver volume (Figs. 2A and 2C) a mechanical couple in the vertical plane about the longitudinal axis $y$—$y$. Because the driver volume is rigidly part of the long bar, an increment of the bar external to the driver volume will be set into vibration and, as the driver volume continues to vibrate, a wave motion moving at the velocity of sound will be progressively transmitted along the bar. Ultimately, the entire bar will vibrate. As this vibration continues, electrodes 4, 6, 5, and 7 will develop a piezoelectric potential derived from the mechanical vibration at positions S, R, O, N, respectively. During the period of vibration build-up, the potential on electrodes 4 and 6 will develop before a piezoelectric potential is developed at electrodes 5 and 7. The piezoelectric potential on electrodes 4, 6, 5 and 7 will alternate at the same frequency as that of the driver volume, but the potential at electrodes 5 and 7 will be less than the potential at electrodes 4 and 6 due to a reduction in vibrational amplitude caused by losses in wave propagation through the bar.

Referring now to Fig. 3, the driver section is shown between the electrodes 2 and 3, and secondary electrodes are positioned along the bar at the locations indicated by N, R, S and O. The total length of the piezoelectric bar is in itself not critical, but the lengths G and H must be compatible with the wave length $\lambda$ in the bar. Therefore, adjustment of the lengths G and H will provide the requisite dimensions to meet the mechanical requirements of the bar. Where the two portions G, H of the piezoelectric bar 1 external to driver volume are of equal length, an equal number of waves will be accommodated on each side of the driver volume as indicated in Fig. 4. However, a wave originating on one side of the driver volume is phased oppositely from the wave concurrently originating on the other side of driver volume, so that, where position O on the right end of the bar corresponds to position N on the left end of the bar, the piezoelectric potential developed at O will be 180° displaced in phase from the phase of the piezoelectric potential developed at N. Hence, for example, when N develops a maximum negative electropotential, O will develop a maximum positive electropotential.

Before going into constructional details, the functions of the various components will be described with reference to Fig. 5. As previously stated, the driver volume is excited by an alternating electric field established between electrodes 2 and 3 by means of a stable local oscillator driver 11.

Electrodes 6 are coupled to a monitor driver control circuit 16 which in turn is connected to driver 11. The piezoelectric potential developed at R is impressed through electrodes 6 on the monitor driver control and that circuit governs the output of driver 11 to stabilize the amplitude and frequency of vibration of the bar 1.

In order to detect the reception of a signal, the piezoelectric potential at O is coupled to signal amplifier 12 through electrodes 5 and, in like manner, the potential at N is taken from electrode 7 and amplified by signal amplifier 13. These potentials are compared differentially by the comparator 14. In the absence of an input signal from source 15, these potentials are of the same amplitude and the comparator indicates zero signal. However, a signal in phase with the vibrations of the bar, derived from signal input source 15, adds vibratory energy to the system, resulting in an increase in the amplitude of vibration at S, which increase travels by wave motion toward O as well as toward the mid-section. The signal energy, after insertion at S, appears at O a finite time later. The interval between the insertion of the signal energy and the arrival of this signal energy at O is dependent on the time which an acoustic wave requires to propagate through the bar between S and O. Another way of stating this is to say that the interval between the injection of the signal at S and the arrival of the signal at O is dependent on the number of wave lengths $\lambda$ (Fig. 4) on the bar between the two points. The increase of vibrational amplitude due to the injection of discrete signals at S will after a time result in an increased amplitude at O. The difference in vibrational amplitude at N and O causes an unbalance in the comparator so that reception of the signal is indicated. Of course, at least several successive bits of signal energy must be injected at S to have any discernible increase in amplitude manifested at O. It is feasible to accommodate as many as 1,000 waves between S and O, provided the proper frequency is derived from the driver. In the latter case, the 1,000 waves between S and O represent 1,000 cycles of integration before any signal is discerned at O. Since velocity of wave propagation in the bar is independent of signal intensity, this provides a reasonable number of cycles of integration before reception is indicated. The received signal will lag its impression at S by the period of integration, but it should be understood that the signal will endure at O after it is terminated at S. The duration of the received signal at O will not be as long as it was at the point of insertion due to wave propagation losses in the bar, but it will be more representative than in cases where integration is achieved by amplitude build-up alone. (For a discussion of a device which relies solely upon amplitude build-up, see Patent No. 2,561,366 to R. W. Hart.) The wanted signal must remain in synchronism with the bar integrator essentially throughout the period of integration; otherwise, out-of-phase components of the signal will materially reduce or cancel out the vibrations in the bar before they reach O.

It has been found in practice that 200 cycles of integration usually provide an adequate period to eliminate the effects of noise while providing a reasonable selectivity to the wanted signal. This seems to be independent of frequency, so the minimum period of required integration for each element of intelligence will be 200 times the period of the wanted signal. It can be shown that by using high frequency vibratory integrators the rate of intelligence communication can be raised to practical speeds, thirty words per minute on telegraphic communications are easily achieved, and sixty words per minute are feasible while retaining the requirement for 200 cycles of integration. For example, using a piezoelectric bar vibrating at a frequency of 100 kc., the integration time is $2 \times 10^{-3}$ sec., which is equivalent in period to a 500 C. P. S. modulation frequency; a one mc. integrator has a period of $2 \times 10^{-4}$ sec., equivalent to one period of a 5 kc. signal; and a 10 mc. integrator has a period of $2 \times 10^{-5}$ sec., equivalent to one period of a 50 kc. signal.

A piezoelectric quartz crystal bar of practical size may be proportioned to contain 2,000 wave lengths of vibration on either side of the driver volume. This provides for 1,000 cycles of integration. It is important to recognize that the vibrator is driven at the frequency at which reception of the desired signal occurs. The wanted signal may, by way of example, be derived by heterodyning a high frequency signal with a local oscillator in the conventional manner; the integrator in this circumstance would be designed to operate at a fixed frequency identical with the intermediate frequency of the receiver. A much preferred embodiment requires the transmitted signal to be modulated at the integrator frequency. The receiver is then constituted by an amplifier, a rectifier, and the integrator. This gives the wanted signal a specific character compatible with the selectivity of the integrator. In this system reception has the advantage of normal selectivity of the signal amplifier plus the selectivity which the integrator provides with reference to the modulation frequency. A considerable amount of R. F. amplification would not paralyze the receiver though the signal be received in an extremely high noise background because of the integrator's inherent action in eliminating the effects of random noise.

Fig. 6 depicts constructional details of the manner of mounting the electrodes on the piezoelectric bar. A housing 17 completely encases the piezoelectric bar 1 which is suspended within the housing in a manner permitting vibration without substantial restraint. For illustrative purposes the housing is shown with one side wall removed to permit a view of the interior. The driver electrodes 2, 3 are held in contact with the bar 1 by means of screws 18 bearing on resilient pads 19 fabricated of an insulating material such as rubber. Electrodes 2 and 3 are identical in construction, hence, only electrode 2 will be described in detail. It can be seen from Fig. 1 that electrode 2 consists of three metallic wedges held together by interlocking splines. The outer wedges are lightly held in position by the screws 18 bearing on pads 19, but the central wedge is free to move and can be moved to and fro by any suitable means such as a screw rotatably mounted on the housing and threaded into the central wedge. As the central wedge is moved the outer wedges will be drawn together or forced apart whereby the width of the electrode can be adjusted. The precisely fitting splines maintain the three sections in a plane and the surface of the electrode is lapped flat to insure uniform contact with the piezoelectric bar. Adjustment of electrodes 2 and 3 permits the lengths G and H (Fig. 3) to be varied to obtain optimum operation of the integrator.

The electrodes 4, 5, 6 and 7 may also be mounted in a manner permitting adjustment of the position at which the electrode bears on the piezoelectric bar surface. One method of accomplishing this purpose is indicated in Fig. 6. A frame 20 is journalled in housing 17 for movement in the manner of a toggle switch. An internally threaded sleeve 21 is mounted by trunnions on the frame so as to permit the sleeve to move vertically and rotate relative to the frame. The frame 20 carries a pair of dependent springs 22 having electrode 23, which is simply a fine wire, suspended between them. A stud 24, mounted for rotation without longitudinal movement in a stanchion 25, has a threaded portion engaged with the internally threaded sleeve 21. Upon rotation of stud 24, electrode 23 is caused to move across the surface of bar 1. The electrode mount is appropriately insulated to prevent the potential on electrode 23 from being shorted to housing 17.

It is manifest that various other means may be readily devised for adjustment of the electrodes. The forms here illustrated are exemplars only, and it is not intended to limit the invention to any particular method of adjustment.

Schematically illustrated in Fig. 7 is the circuitry for driving the piezoelectric bar vibrator 1 at the desired frequency and amplitude. Initially, the piezoelectric bar 1 is set into vibration at the desired frequency by a highly stable local oscillator. In the embodiment illustrated, an oscillator 32 under the control of a precise crystal is connected by switch 43 to an amplifier 30 whose output is utilized to drive power amplifier 31. The tuned output circuit 33 of power amplifier 31 is adjustably coupled by link 27 to coil 34, and the latter is connected to driver electrodes 2, 3. When excited by output circuit 33, coil 34 causes a radio frequency field to be established between the driver electrodes whereby the entire piezoelectric bar 1 is caused to vibrate by waves propagating outwardly from the driver volume. In order to provide a measure of control over the vibratory amplitude of the bar, the adjustable coupling link 27 is provided between output circuit 33 and coil 34.

An amplifier 35 of the conventional push-pull type is connected to electrodes 6 to amplify the piezoelectric potential developed at R. The output circuit 28 of amplifier 35 feeds a full wave radio frequency rectifier circuit consisting of a center tapped coil 36, a potentiometer 37, a meter 38, and rectifiers 39, 40. Coil 36 is excited from output circuit 28, causing a D. C. component of current to be set up in potentiometer 37 which may be observed on monitoring meter 38. A voltage is taken off potentiometer 37 through adjustable tap 41 and utilized to control the vibrational amplitude of the piezoelectric bar 1 by applying this voltage to amplifier 30 to regulate its gain in a manner similar to conventional AGC circuits. It is apparent that the D. C. component of current, from which is derived the amplitude control voltage, may be filtered, if necessary, to reduce ripple.

After the piezoelectric bar has been set into vibration by means of crystal oscillator 32, fast acting switch 43 is employed to switch from crystal oscillator 32 to circuit 42, thereby causing vibrating bar 1 to be self-driven by means of a feedback loop. Mechanical vibrations emanating from the driver volume and travelling down the bar toward R cause a potential to develop between electrodes 6 which is amplified and appears in the output circuit 28 of amplifier 35. The output circuit 28 is coupled through link 29 to the tuned input circuit 42 of controlled amplifier 30; thus, amplifier 30 is excited by a signal derived from the vibrations of bar 1 and the vibrator, in this fashion, acts to maintain its own frequency at a fixed value.

It is highly desirable to start the piezoelectric bar 1 vibrating by initially employing a highly stable local oscillator. If one attempted to set the bar 1 into vibration by striking it, in the manner of a tuning fork, the waves emanating from the driver volume would be greatly attenuated by the time they reached electrodes 6 and probably could not develop sufficient piezoelectric potential to actuate the self-excitation system. Moreover, the local oscillator establishes the desired vibrational frequency in the bar as otherwise an undesired vibrational frequency may result. After the bar is set into vibration, a self-excited system is substituted for the local oscillator excitation system because the constant driving frequency required cannot be maintained by even the best crystal oscillators over an extended period of time.

Fig. 8 illustrates a scheme particularly suited to the reception of a signal in a background of heavy random noise. A pair of tunable radio frequency (R. F.) amplifiers 44, 45 are employed, each of which is associated with an antenna 49, 50. Amplifier 44 is tuned to receive the signal plus whatever noise arrives with the signal; amplifier 45 is slightly detuned to reject the signal and, hence, only noise is accommodated. The outputs from these amplifiers are applied to a balancing network 46 through adjustable taps 47 and 48. The signal is such that it contains a major component of energy whose frequency is the same as that of the vibrating bar 1. Electrodes 4 are adjusted so that the signal energy derived from the balancing network to which they are connected is added in phase with the vibrations of the bar. Because the tuning of amplifiers 44 and 45 are only slightly different, the noise obtained from amplifier 45 will be compatible with that which is associated with the signal over the period of integration whereby the noise energies will tend to balance out. By adjustment of taps 47 and 48 of the balancing network, the effects of noise can be made essentially alike in both sides of the circuit. Noise energy associated with the signal, when impressed on the integrator, will momentarily tend to vibrate the bar in one direction while noise energy from the compatible source will oppose this tendency. The noise spectrums of the two sources need not be in phase but the total energy contained in these sources must be equal in magnitude over the period of integration.

The wanted signal will add energy to the vibrational system resulting in an increased amplitude of vibration. The signal need have only an amount of energy per cycle exceeding the losses in the bar per cycle to result in signal detection. Because the piezoelectric bar is maintained in vibration from a local driver source, the signal energy required is solely that necessary to cause an increase in the vibrational amplitude from the normal (i. e., no signal) vibrational amplitude.

The circuitry for obtaining an output indication is schematically shown in Fig. 9. Two similar R. F. push-pull amplifiers 12, 13 are employed, one amplifier functioning to amplify the piezoelectric potential on the electrodes 7, and the other amplifying the piezoelectric potential established at electrodes 5. Amplifiers 12, 13 have a high impedance input circuit to prevent shunting of the input piezoelectric signal and are of the conventional push-pull type designed to pass the frequencies involved. The amplified signals taken from the outputs of amplifiers 12, 13 are impressed upon a bridge differential circuit for the purpose of detecting the difference in piezoelectric potential at N compared with the piezoelectric potential at O.

The bridge differential circuit is formed by tubes 51, 52, 53, 54 and their associated circuit elements. The anodes of tubes 51 and 52 are connected through a common resistor 55 to a source of electrical potential 56. In identical fashion the anodes of tubes 53, 54 are connected through a common resistor 57 to the potential source 56. Since the tubes of the bridge circuit are operated class A, any suitable source of appropriate grid bias voltage may be utilized. In the embodiment illustrated in Fig. 9, tubes 51, 53 are cathode biased by resistor 58 shunted by by-pass condenser 59; tubes 52, 54 are similarly cathode biased.

The phase relationships with respect to ground of the output signals of amplifiers 12, 13 are indicated in Fig. 9 where $E_N$ = maximum voltage amplitude at N
$E_O$ = maximum voltage amplitude at O
$wt$ = angular frequency of the integrator.

The coupling of the input signals to the bridge differential circuit is arranged so that tube 51 is phased oppositely to tubes 52 and tube 53 is phased oppositely to tube 54. For example, if $E_N \sin wt$ is impressed upon tube 51 and $E_N \sin (wt+\pi)$ is impressed upon tube 52, then $E_O \sin wt$ must be impressed on tube 53 and $E_O \sin (wt+\pi)$ must be impressed on tube 54. When the integrator is operating in the absence of signal, the bridge circuit is adjusted to provide a zero current resultant in its output circuit. The operation of the bridge circuit, then, is such that tube 51 is excited in opposite phase to tube 52, tube 53 is excited in opposite phase to tube 54, and the combined output from these tube pairs normally produces a zero current resultant.

The influence on the bridge circuit of small variations in the vibrational amplitude of the integrator caused by the driver source is minimized. For example, where the driver source momentarily causes the vibrational amplitude of the piezoelectric bar 1 to decrease, both sides of the piezoelectric bar will be affected equally and, hence, the piezoelectric potential at points N and O will decrease in equal degree. This decrease will then fail to affect the bridge circuit because that circuit is sensitive only to a condition where the piezoelectric potential at O is different from the piezoelectric potential at N. An equal decrease of potential at N and O will, hence, not be indicated. When the vibrational amplitude at O exceeds the "standard" amplitude at N, as it will after the impress of a signal at S, the bridge balance is upset and a differential output obtains in the bridge circuit.

Resistor 55 is provided with an adjustable tap 60 which conveys a voltage through isolating capacitor 61 to the control grid of tube 62. Resistor 57 is similarly provided with a tap 63 for conveying a voltage through isolating capacitor 64 to the control grid of tube 65. Tubes 62 and 65 are connected to act as sharp cutoff rectifiers. Under steady-state conditions, vibrations in piezoelectric bar 1 generate voltages at O and N that are identical in magnitude and opposite in phase; consequently, the voltage developed across resistor 55 is equal to the voltage developed across resistor 57 so that taps 60 and 63 are at the same potential and tubes 62 and 65 show no signal.

After a signal is impressed at S and integrated, the voltage at O consists of the steady-state voltage plus a voltage due to the increased vibration resulting from the signal energy added at S. In this circumstance the voltage at O is greater than the voltage at N, the differential bridge is unbalanced, and a differential current is set up in resistors 55 and 57 due to the difference in voltage between tap 60 and tap 63. This voltage difference is rectified in either tube 62 or tube 65, depending upon the instantaneous polarity of the differential voltage, and the full wave rectified current flows in the common plate circuit of the rectifiers.

Plate potential for rectifier tubes 62 and 65 is supplied by a battery 66 returned to ground through an adjustable resistor 67. Plate current flowing in tube 62 or 65 causes a voltage drop to occur across resistor 67; this voltage drop has a D. C. component and a ripple frequency which is twice the frequency of the integrator.

There are several obvious means for utilizing the A. C. or D. C. component of the rectified current to produce an output indication. By way of example, an amplifier tube 68 may be directly connected to derive its input signal from the D. C. voltage component across resistor 67. A relay 69 in the plate circuit of amplifier 68 is then caused to key an audio oscillator 70 to permit reception of code signals. The relay 69 could equally well actuate a teletype system or a tape recorder system.

As another example, the A. C. component of the rectified output may be amplified in an R. F. amplifier to derive a high frequency signal input to an I. F. amplifier type receiver, thus gaining high sensitivity to instantaneous differences between $E_O$ and $E_N$. This latter scheme is applicable when short time constants are desired in the output circuit and is particularly applicable to acoustic detection and direction finding.

Obviously many modifications and variations of the present invention are possible in the light of the above teachings. For example, while the invention has been described with electrodes 5 and 7 positioned at corresponding locations on opposite sides of the piezoelectric bar, this need not be so. The positions of electrodes 5 and 7 need not be symmetrical about the driver volume for when placed asymmetrically, the comparator bridge may be adjusted to give zero output in the absence of an input signal at electrodes 4. It is therefore to be un-

What is claimed is:

1. An integrating signal detector comprising, a piezoelectric bar, means for establishing an alternating electric field across a driver volume of said bar, said bar including elongate portions extending from opposite sides of said driver volume, piezoelectric potential detecting means mounted on each of said portions adjacent the free end thereof, means for injecting a signal to be detected at a point on said bar intermediate said driver volume and one of said piezoelectric potential detecting means, and comparator means coupled to said detecting means, said comparator means being responsive to the difference in piezoelectric potentials detected by said detecting means.

2. An integrating signal detector comprising, a piezoelectric bar, means for establishing an alternating electric field across an intermediate volume of said bar whereby elongate portions of said bar on opposite sides of said volume may be set into vibration, detector electrodes mounted on each of said elongate portions for detecting piezoelectric potentials, signal injection electrodes mounted on one of said elongate portions, and comparator means coupled to said detector electrodes for indicating piezoelectric potential differences.

3. A signal integrator for detecting signals comprising, a piezoelecric bar, driver electrodes disposed on opposite surfaces of a central volume of said bar, means coupled to said driver electrodes adapted to cause an alternating electric field to be established between said driver electrodes whereby the portions of said bar external to said central volume may be set into vibration, said external portions each being of a length sufficient to accommodate simultaneously a plurality of waves emanated from said central volume, detector electrodes positioned on said piezoelectric bar adjacent the ends thereof, signal injection electrodes disposed on said piezoelectric bar between said central volume and one end of said bar, a signal source coupled to said injection electrodes, and comparator means coupled to said detector electrodes, said comparator means being adapted to produce an output indicative of the difference in piezoelectric potentials developed adjacent the two ends of said bar.

4. An integrating signal detector comprising, a piezoelectric bar, driver electrodes disposed on opposite surfaces of a central volume of said bar, a regulated power source coupled to said driver electrodes adapted to cause a radio frequency electric field to be established between said driver electrodes whereby the portions of said bar external to said central volume may be set into vibration, said external portions each being of sufficient length to accommodate simultaneously a plurality of waves emanated from said central volume, monitor electrodes positioned on one of said external portions, means coupling said monitor electrodes to the regulating circuit of said power source, detector electrodes positioned on said piezoelectric bar adjacent the ends thereof, signal injection electrodes intermediately disposed on the other of said external portions, a signal source coupled to said injection electrodes, and comparator means coupled to said detector electrodes, said comparator means being adapted to produce an output indicative of the difference in piezoelectric potentials developed adjacent the two ends of said bar.

5. An integrating signal detector comprising a piezoelectric bar, means for coupling an alternating electric field of a predetermined frequency across a midportion of said bar whereby said bar is caused to vibrate at said predetermined frequency, said bar including portions extending from opposite sides of said mid-portion by equal amounts, means mounted on each of said portions and equally spaced from said mid-portion for detecting piezoelectric potentials existing thereat, means for coupling a signal to a point on said bar intermediate said midportion and one of said pieozelectric detecting means whereby that component of said signal having a frequency corresponding to the frequency at which said bar is vibrating appears after a predetermined time at the detecting means adjacent thereto, and means for providing an indication of the difference in magnitudes of the signals detected by both of said piezoelectric detecting means.

6. An integrating signal detector comprising, in combination, a piezoelectric bar, means for vibrating said bar by coupling to its mid-portion an alternating electric field of a predetermined frequency, said bar including elongated portions extending from opposite sides of said mid-portion by equal amounts, means mounted on each of said elongated portions and equally spaced from said mid-portion for detecting the piezoelectric potentials thereat, and means for coupling a signal containing a frequency component corresponding to the vibratory frequency of said bar to a point on said bar intermediate said midportion and one of said detecting means, and means for providing an indication of the difference in amplitudes of the outputs of said detecting means.

7. An integrating signal detector comprising, in combination, a piezoelectric bar, means for vibrating said bar in a sheer mode at a predetermined frequency, first and second detector means mounted at equal distances from the ends of said bar for providing an indication of the amplitude and phase of the electrical potentials existing thereat, means for coupling a signal containing a frequency component corresponding to the frequency at which said bar is vibrating to a point between the mid-portion of said bar and one of said detector means whereby the electrical potentials existing at said detectors have unequal amplitudes, and means for providing an indication of this difference in amplitudes.

References Cited in the file of this patent

UNITED STATES PATENTS

| | | |
|---|---|---|
| 2,274,486 | Koch | Feb. 24, 1942 |
| 2,381,173 | MacLean | Aug. 7, 1945 |
| 2,387,472 | Sontheimer | Oct. 23, 1945 |